United States Patent [19]

Assaf

[11] Patent Number: 4,707,995
[45] Date of Patent: Nov. 24, 1987

[54] APPARATUS AND METHOD FOR CONTROLLING TEMPERATURE AND HUMIDITY WITHIN AN ENCLOSURE

[75] Inventor: Gad Assaf, Rehovot, Israel

[73] Assignee: Geophysical Engineering Company, Seattle, Wash.

[21] Appl. No.: 738,544

[22] Filed: May 28, 1985

Related U.S. Application Data

[63] Continuation of Ser. No. 377,368, May 12, 1982, abandoned.

[30] Foreign Application Priority Data

Jun. 18, 1981 [IL] Israel ......................................... 63115

[51] Int. Cl.$^4$ .............................................. F25D 17/06
[52] U.S. Cl. ........................................ 62/94; 62/271;
62/309; 62/311; 237/1 R; 237/81
[58] Field of Search ................. 62/304, 309, 312, 271,
62/92, 94, 93, 91; 126/415, 400; 165/104.25;
237/1 R, 81

[56] References Cited

U.S. PATENT DOCUMENTS

| Re. 20,933 | 11/1938 | Altenkirchi | 62/92 |
|---|---|---|---|
| 1,919,781 | 7/1933 | Forrest et al. | 62/271 |
| 2,017,027 | 10/1935 | Forrest | 62/93 X |
| 2,405,169 | 8/1946 | Sutton . | |
| 4,160,523 | 7/1979 | Stevens | 126/400 |
| 4,164,125 | 8/1979 | Griffiths . | |
| 4,197,714 | 4/1980 | Bradshaw . | |
| 4,315,402 | 2/1982 | Sadhukhan | 165/104.25 |
| 4,355,683 | 10/1982 | Griffiths | 126/415 X |

FOREIGN PATENT DOCUMENTS

| 038213 | 10/1981 | European Pat. Off. . | |
|---|---|---|---|
| 2844935 | 2/1979 | Fed. Rep. of Germany . | |
| 2428211 | 9/1980 | France . | |
| 236337 | 10/1960 | Israel | 126/415 |

Primary Examiner—Henry A. Bennet
Attorney, Agent, or Firm—Sandler & Greenblum

[57] ABSTRACT

Apparatus for humidity and temperature control of the air in an enclosure comprising brine-vapor-air direct heat exchanger apparatus disposed in communication with an enclosure and a brine reservoir arranged to store brine and to be exposed to naturally occuring temperature gradients for desired conditioning of the brine. The temperature gradients may be relatively short term, such as day-night or may be longer term, such as summer-winter.

46 Claims, 8 Drawing Figures

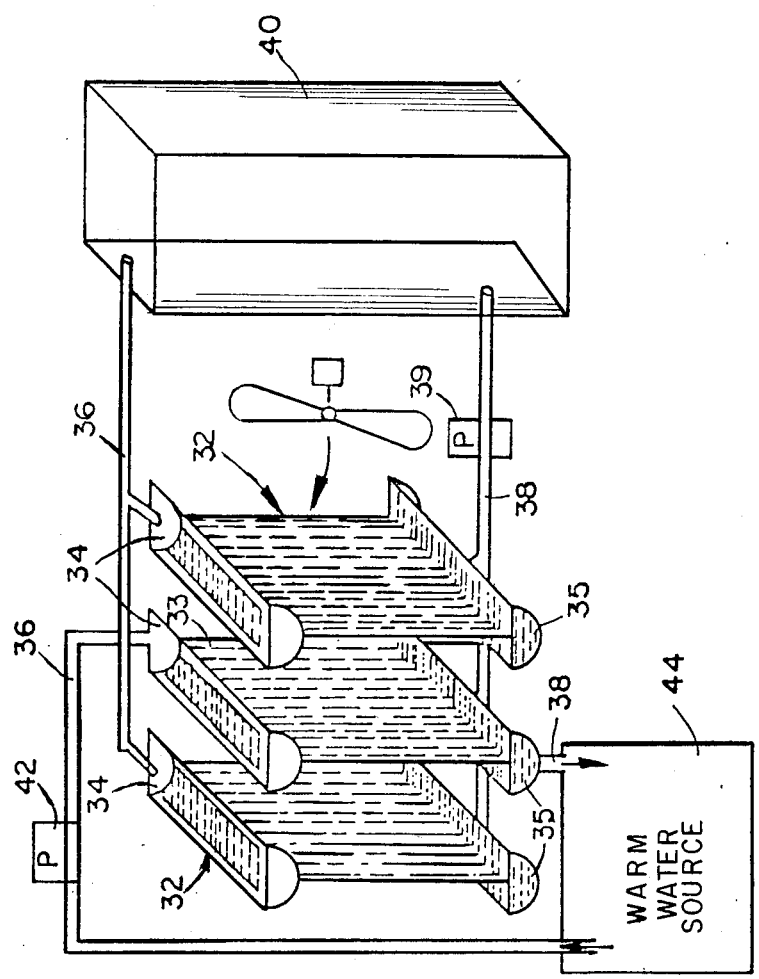
F I G. 2B.

APPARATUS AND METHOD FOR CONTROLLING TEMPERATURE AND HUMIDITY WITHIN AN ENCLOSURE

This application is a continuation of application Ser. No. 377,368, filed May 12, 1982, now abandoned.

FIELD OF THE INVENTION

The present invention relates to apparatus and methods for environmental control within an enclosure and more particularly to apparatus and methods for governing the temperature and humidity within an enclosure.

BACKGROUND OF THE INVENTION

It is conventional to provide space heating and cooling by means of combustion of fuels. From a thermodynamic standpoint, this approach is rather wasteful, since a relatively small temperature head is all that is required, and the burning of fossil fuels is capable of producing much larger temperature gradients.

It has been proposed by Zamir Levav and Arbel From of the State of Israel Agriculture Research Organization, P.O.B. 6 Beit Dagan, Israel, to cool a greenhouse during the day and heat it during the night by means of a water spray in the greenhouse coupled to a temperature-retaining water reservoir. This system was found to be impractical for most applications since the spray in the greenhouse caused the air therein to become saturated with water vapor and thus unsuitable for growth of all but tropical plants. The same considerations render the water spray system unsuitable for heat of enclosures housing humans and for most other applications as well.

The use of a brine spray for dehumidification is well known and is illustrated, for example, in U.S. Pat. No. 2,405,169. Here, a refrigeration system is proposed employing a brine spray, which is first exposed to atmospheric air from within an enclosure for absorbing moisture therefrom, and is then heated as by a boiler, to enable it to release this moisture when sprayed in a regeneration chamber. In the system of U.S. Pat. No. 2,405,169, cooling is produced by passing air through a chamber wherein water is caused to evaporate due to the presence of concentrated brine adjacent thereto.

U.S. Pat. No. 2,133,334 discloses a stabilized absorbent solution of zinc salts for dehydrating air and indicates the utility of such a solution for controlling the temperature and water vapor content of the air. The system proposed in this patent employs combustion heat sources for heating the solution for concentration thereof as well as cold sources, i.e. heat sinks, for subsequently cooling the brine. The system is designed to maintain the brine temperature constant in order to maintain predetermined dehumidifying characteristics with the highly ygroscopic solution which is employed. There is no teaching of using the brine spray for heating of an enclosure.

The apparatus of the above-mentioned prior art patents have as their function dehumidification and cooling using brine sprays. They employ combustion of fuel for providing the required temperature gradients for operating the system and do not propose any economics in energy utilization over other conventional systems.

SUMMARY OF THE INVENTION

The present invention seeks to overcome disadvantages of prior art proposed systems for temperature and humidity control and to provide apparatus for temperature and humidity control which is highly efficient and extremely conservative of energy inputs from fossil fuels.

There is thus provided in accordance with an embodiment of the present invention apparatus for humidity and temperature control of the air in an enclosure comprising brine-vapor-air direct heat exchanger apparatus disposed in communication with an enclosure and a brine reservoir aranged to store brine and to be exposed to naturally occurring temperature gradients for desired conditioning of the brine. The temperature gradients may be relatively short term, such as day-night or may be longer term, such as summer-winter.

The term "brine" will be used throughout the specification and claims to mean a hygroscopic material. Normally the hygroscopic material will be a solution such as a brine. Alternatively other types of solutions such as ethylene glycol based solutions may be employed.

Further in accordance with an embodiment of the present invention there is provided apparatus for space heating of an enclosure comprising brine-vapor-air direct heat exchanger apparatus disposed in communication with an enclosure and condensation heat storage means providing a supply of brine having latent heat of condensation sufficient to provide desired heating of the enclosure.

The temperature of the brine maybe greater or less than the temperature of the enclosure being heated.

Additionally in accordance with an embodiment of the present invention, solar powered apparatus may be provided for heating of the brine. The apparatus may comprise a solar evaporation pond.

BRIEF DESCRIPTION OF THE DRAWINGS

The present invention will be more fully understood and appreciated from the following detailed description taken in conjunction with the drawings in which:

FIGS. 2A and 2B each illustrate an alternative embodiment of brine-vapor-air heat exchanger useful in the invention;

DETAILED DESCRIPTION OF THE INVENTION

Figure 1:
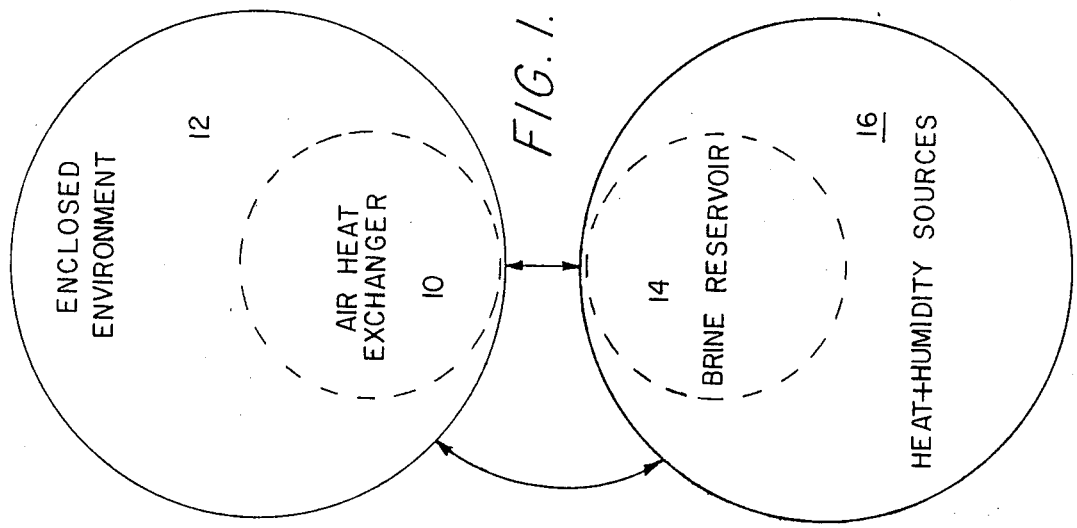
FIG. 1 is a diagrammatic illustration of apparatus for controlling temperature and humidity within an enclosure constructed and operative in accordance with an embodiment of the present invention.

Reference is now made to FIG. 1 which illustrates in general diagrammatic form apparatus for humidity and temperature control of an environment employing brine as the heat transfer medium, in accordance with the present invention. the apparatus comprises a brine-vapor-air heat exchanger 10 which is disposed within an enclosed environment 2, such as a room, greenhouse or vehicle, or in communication therewith. Brine is supplied to the heat exchanger 10 from a brine reservoir 14 which is associated with sources 16 and/or sinks of heat and/or humidity for governing the temperature and concentration of the brine supplied to the brine-vapor-air heat exchanger.

The present invention involves a particular appreciation that since the vapor pressure of brine is lower than that of water at the same temperature, brine may be used to heat an environment while at the same time absorbing moisture therefrom. The condensation of moisture from the surrounding environment on the brine converts the latent heat of condensation to sensible heat and further heats the brine. Extremely efficient heating of an environment is thus provided in accordance with an embodiment of the present invention..

According to a preferred embodiment of the invention, reservoir 14 provides sufficient brine storage capacity to enable the brine to be concentrated by solar heat and cooled by the ambient environment. Expressed in other terms, the storage capacity is sufficient so as to enable a significant portion of the energy requirements for heating and cooling the brine and for concentration thereof to be provided by temperature gradients over time in the ambient environment. These gradients may be relatively short term as between day and night, or between sun and shade, or alternatively they may be longer term, as between summer and winter.

Figure 2A:
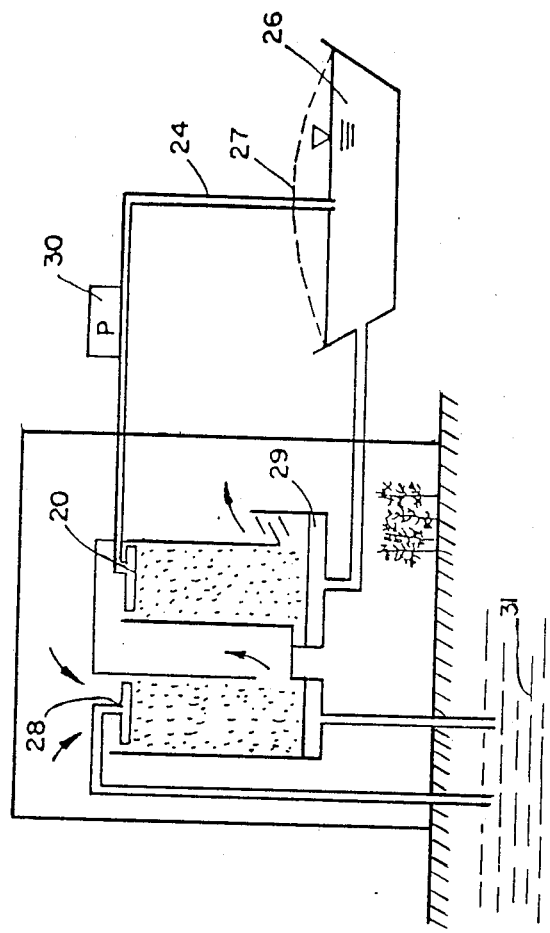

Reference is now made to FIG. 2A which illustrates one embodiment of the brine-vapor-air heat exchanger constructed and operative in accordance with an embodiment of the present invention and comprising a brine spray head 20 coupled to a source of brine 24 which is coupled, in turn, to a brine reservoir 26. Brine reservoir 26 may typically be a solar evaporation pond which may be provided with a removable covering 27. The covering 27 may provide protection from rain and resulting dilution of the brine stored therein and may also serve to retain heat in the brine when the brine is used for heating.

According to a preferred embodiment of the invention, particularly suitable for space heating of the enclosed environment, air first passes through a water spray 28 or is otherwise exposed to a source of water vapor and then passes through a spray of brine provide by spray head 20. The brine spray head 20 provides a spray that falls by gravity in direct contact with the air to be treated and collects in a receptacle 29. Depending on the relative vertical orientation of the elements of the system, a pump 30 may be provided to circulate the brine from the brine reservoir 26 through the heat exchanger spray head 20.

According to one embodiment of the inventio, the brine reservoir may be located outside of the enclosed environment whose temperature and humidity it is desired to control. According to an alternative embodiment of the invention, the reservoir may be located within the enclosed environment.

Water spray 28 may be supplied with water from any suitable source including, for example, a warm water aquifer 31. Alternatively the water spray 28 may be replaced by any other source of water vapor, such as growing plants located within the enclosed atmosphere. The presence of a vapor source is important when the brine-vapor-air heat exchanger is being used in a heating mode since it provides vapor for condensation onto the brine, thus releasing latent heat of condensation and converting it into sensible heat. When cooling is desired, the heat sources maintaining the vapor sources at a constant temperature should be eliminated insofar as possible and the heat of evaporation should be removed as quickly as possible from the enclosure.

Reference is now made to FIG. 2B which illustrates a different type of brine-vapor-air heat exchanger comprising a plurality of elongate falling brine film assemblies 32 operating adjacent an elongate falling water film assembly 33. Each of the falling film assemblies comprises a supply trough and a receiving trough 35 and supply and drainage conduits 36 and 38. The brine or water, as the case may be, falls from the supply troughs 34 through elongate slits formed in the bottom thereof in a generally planar film to the receiving troughs 35. According to a preferred embodiment of the invention, a web of material such as woven jute may be provided to define the film path and to enable relatively slow travel of the brine film therealong. Alternatively any other material having capillary characteristics for slowing the brine flow under gravity may be used. According to an alternative embodiment of the invention, the material may communicate with the top of supply trough 34 and thus eliminate the need for provision of slits in the bottom thereof. A pump 39 serves to circulate the brine as desired between the brine film assemblies 32 and a brine reservoir 40. Another pump 42 may be provided to circulate water from a vapor source such as a warm water aquifer 44 to assembly 33. The principle of operation of the apparatus of FIG. 2B is substantially similar to that of the apparatus of FIG. 2A. It is appreciated that in both cases, the water serving as the vapor source may be supplied at a temperature below the temperature of the environment, since the brine, having a lower vapor pressure than the water at the same temperature, acts as a heat pump in causing the vapor to evaporate thereon, releasing the latent heat of condensation. Normally the vapor source should provide water at 10° C. or above.

It is appreciated that in the course of circulation through the heat exchanger in contact with vapor, the brine will pick up moisture and become diluted. The more it becomes diluted, the more its vapor pressure will increase and approach that of water, and consequently its ability to pick up additional moisture and release latent heat of condensation will decrease. Therefore it is necessary to concentrate the brine so as to maintain its concentration at an acceptable level.

It is a particular feature of the present invention that sufficient brine is provided for circulation through the heat exchanger such that the condensation heat capacity thereof is sufficient to provide desired heating without requiring continual concentration of the brine to restore its desired properties.

It is also a particular feature of the invention that a brine reservoir of sufficient capacity is provided such that a sufficient quantity of brine at a desired temperature and concentration is available so that desired heat and humidity control can be effected without requiring the use of fossil fuels to adjust the characteristics of the brine.

More particularly, it is a particular feature of the present invention that sufficient brine reservoir capacity is provided such that temperature gradients occurring naturally such as day-night, sun-shade or seasonal temperature gradients can be used to provide brine of desired characteristics.

Figure 3A:
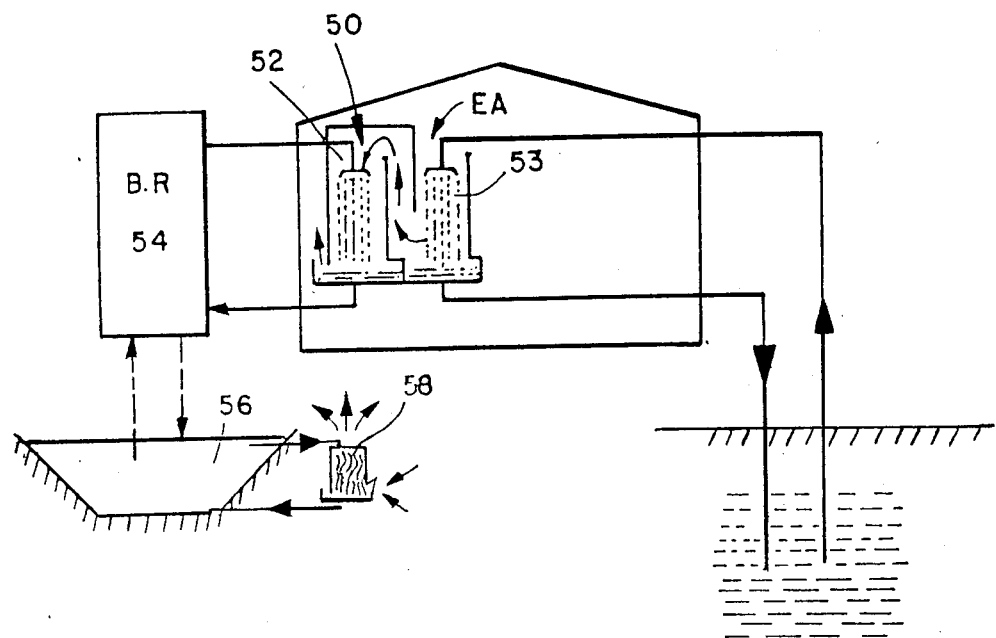
FIGS. 3A, 3B, 3C and 3D each illustrate an alternative embodiment of brine heat sources and vapor sinks useful in the invention.

Referene is now made to FIGS. 3A–3D which illustrate various systems for concentrating brine in association with heat-exchanger apparatus. In the embodiment of FIG. 3A there is illustrated a brine-vapor-air heat exchanger 50 comprising water and brine spray heads 52 and 53 arranged so as to define an air circulation path therepast such that the air travels parallel to the direction of the spray. The heat exchanger 50 is coupled to a brine reservoir 54 which may comprise or be connected to a solar evaporation pond 56. The solar evaporation pond 56 typiclly comprises an open pond filled with brine and exposed to direct sunlight. The sunlight causes heating and consequent evaporation of the brine. The rate of evaporation of the brine may be enhanced by circulation thereof through a cooling tower 58. Such a cooling tower typically comprises apparatus for permitting the brine to contact air with a high surface area-to-volume ratio. and may employ a brine spray.

Figure 3B:
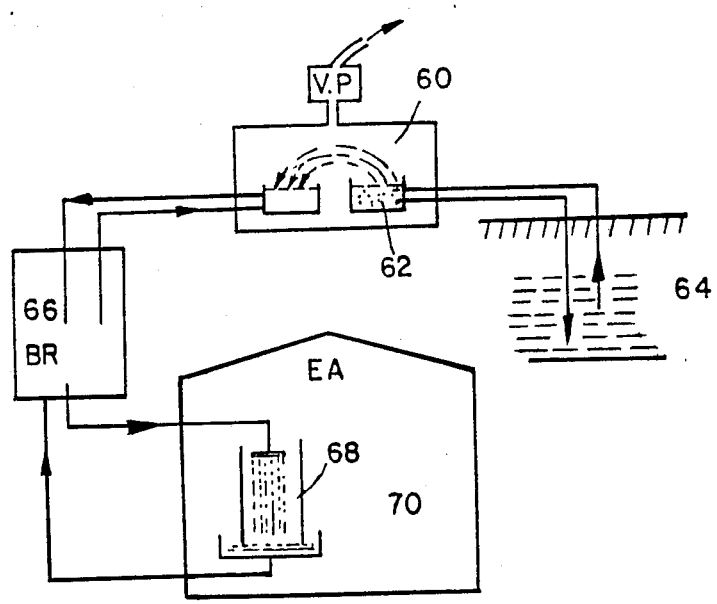

Referring no to FIG. 3B, there is seen a flash evaporator and condenser 60 which is employed for heating and concentrating brine in the presence of a vapor source 62 coupled to a warm water reservoir 64. Condenser 60 is coupled to a brine reservoir 66 which in turn communicates with a brine-vapor-air heat exchanger 68 located within an enclosure 70.

Figure 3C:
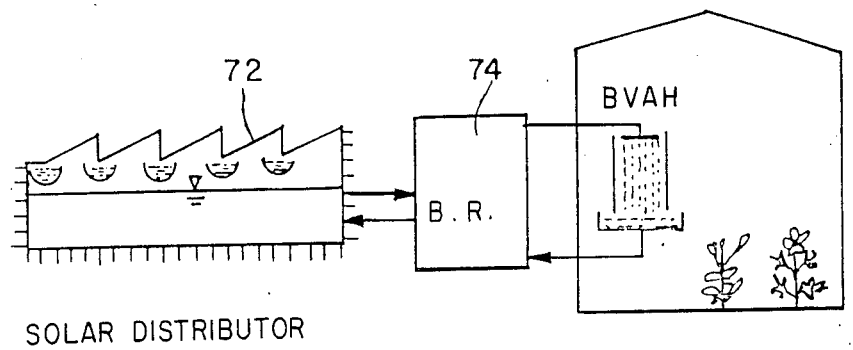

FIG. 3C illustrates the use of a solar distiller 72 for heating and concentrating brine supplied thereto from a brine reservoir 74.

Figure 3D:
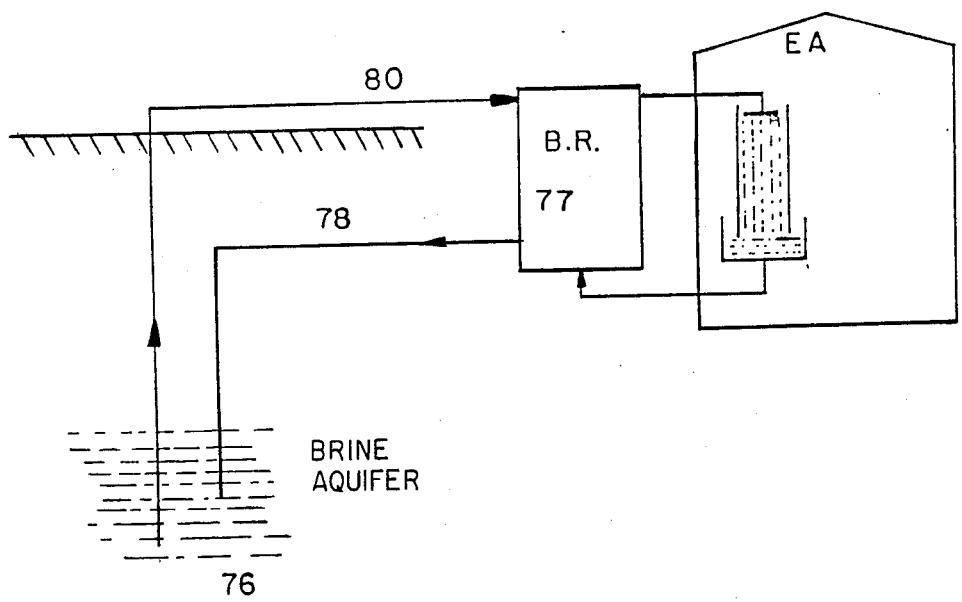

FIG. 3D illustrates an alternative embodiment of concentrated brine supply wherein a brine aquifer 76 is employed as a virtually endless supply of concentrated brine. The dilute brine is recycled from a brine reservoir 77 to the aquifer via a conduit 78 while concentrated brine is supplied to the reservoir via a conduit 80.

Figure 4:
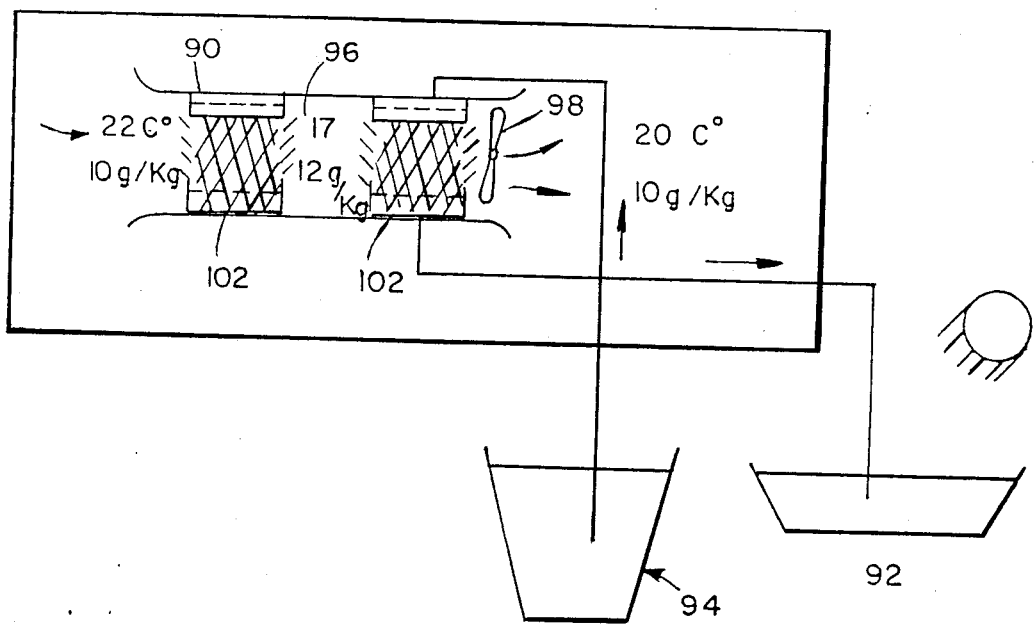
FIG. 4 is a diagrammatic illustration of cooling apparatus constructed and operative in accordance with the present invention.

Reference is now made to FIG. 4 which shows apparatus for cooling constructed and operative in accordance with an embodiment of the present invention and comprising a cooling assembly 90 located in communication with an enclosure to be cooled and brine evaporating apparatus 92 and reservoir 94, located out of communication with the enclosure. The cooling assembly comprises an air pathway 96 which is provided with a fan 98 for forcing air therethrough. The incoming air first passes through a water evaporator 100 of conventional construction at which its temperature is reduced, typicaly from 22° C. to 17° C. and its humidity is increased, typically from a vapor concentration of 10 g/kg to a concentration of 12 g/kg.

From evaporator 100, the cooled air then passes through a brine condenser 102 which typically raises the temperature of the air to 20° while reducing its humidity to 10 g/kg. vapor concentration. It may be appreciated from the preceding discussion that the brine in brine condenser 102 becomes diluted. The dilute brine is supplied to brine evaporator 92, such as a solar evaporation pond. Evaporation of vapor from the pond cools the brine therewithin to a temperature of approximately 30° for resupply to the condenser. This cooled brine is first supplied to a temperature insulated brine reservoir 94 which does not permit direct contact between the brine and cooling air, so as to prevent condensation of vapors on the brine, and the consequent heating of the brine from the release of the latent heat of condensation.

According to an alternative embodiment of the invention, reservoir may be located at the inlet to the brine evaporator, particularly where that evaporator is not in the form of a solar evaporation pond. It is a particular feature of the present invention that the reservoir or reservoirs and the overall brine supply should be of sufficient capacity to enable evaporation and cooling of the brine to be carried out primarily by naturally occurring temperature gradients.

In the preceding discussion, mention has been made of the significant energy storage potential of concentrated brine. The following brief discussion is intended to provide an illustration of the quantities of energy which can be stored in a typical application.

It is known that evaporation of Dead Sea brine over a summer can increase its density from approximately 1200 to approximately 1350 Kg/m$^3$ at a temperature of about 35° C. At a density of 1350 Kg/m$^3$, the brine has a vapor pressure which is 35% of that of water at the same temperature, while at a density of 1200 Kg/m$^3$, the brine has a vapor pressure which is 75% of that of water at the same temperature. The dilution of the brine from 1350 kg/m$^3$ to 1200 kg/m$^3$ involves the condensation of 650 Kg of water per m$^3$ of brine. This condensation releases 440 Kwh of heat per m$^3$ in the form of latent heat of condensation which is converted to sensible heat of the brine.

It may be appreciated therefore that a reservoir of 1000 m$^3$ of Dead Sea Brine has a condensation heat capacity for operation in a humidity range of 35%–75% of 440,000 Kwh.

It will be appreciated by persons skilled in the art that the invention is not limited by what has been particularly shown and described hereinabove. Rather the scope of the present invention is defined only the the claims which follow:

I claim:

1. A method for space heating an enclosure at night comprising the steps of: providing a source of water vapor inside said enclosure during the day; providing a supply of brine whose enthalpy is less than the enthalpy of the air in the enclosure during the day, and whose concentration is such that the brine is hygroscopic; exposing brine from said supply to the air in said enclosure during the day for causing water vapor in the air to condense on the brine drying the air and heating the brine as latent heat is transferred to the brine; returning the heated brine to the supply; and exposing brine from said supply to the air in the enclosure at night thus returning thereto latent heat removed during the day.

2. A method according to claim 1 wherein said source of water vapor is constituted by the expiration of growing plants.

3. Apparatus for conditioning air inside an enclosure comprising: a water vapor source located inside said enclosure; means for supplying brine that is cooler than the air in the enclosure; a brine-vapor-air direct contact heat exchanger apparatus in communication with said enclosure whereby vapor in the air condenses on the brine thereby drying the air during one period of time; and means including said direct contact heat exchanger for utilizing the latent of condensation of the vapor on the brine to heat the air in the enclosure during another period of time.

4. Apparatus according to claim 3 wherein said source of water vapor is constituted by the expiration of growing plants.

5. Apparatus according to claim 3 wherein said source of water vapor is aquifer water.

6. Apparatus according to claim 5 wherein the aquifer water is warmer than the air in the enclosure.

7. Apparatus for cooling and drying air inside an enclosure during one period of time and heating said air during another period of time, said apparatus comprising: means for generating water vapor inside said enclosure; a direct contact heat exchanger; means for circulating the air in the enclosure through the heat exchanger; a reservoir containing brine whose enthalpy is less than the enthalpy of the air in the enclosure during said one period of time; means for exchanging brine between said reservoir and the heat exchanger during both periods of time; the concentration of said brine during said one period being such that vapor in the air in the enclosure condenses on the brine thereby drying the air and diluting the brine returned to the reservoir; and said reservoir being constituted by a solar evaporating pond constructed and arranged to to have a capacity such that water extracted from the air in said enclosure is evaporated to maintain the concentration of brine supplied to the heat exchanger.

8. Apparatus according to claim 7 wherein the means for generating water in the enclosure are plants.

9. Apparatus according to claim 7 wherein water evaporated from the pond is collected and condensed to provide fresh water.

10. Apparatus for cooling and drying air inside an enclosure during one period of time and heating said air during another period of time, said apparatus comprising: means for generating water vapor inside said enclosure; a direct contact heat exchanger; means for circulating the air in the enclosure through the heat exchanger; a reservoir containing brine whose enthalpy is less than the enthalpy of the air in the enclosure during said one period of time; means for exchanging brine between said reservoir and the heat exchanger during both periods of time; the concentration of said brine during said one period being such that vapor in the air in the enclosure condenses on the brine thereby drying the air and diluting the brine returned to the reservoir; and a flash evaporator associated with said reservoir for evaporating water extracted from the air in said enclosure to maintain the concentration of brine supplied to the heat 11. A method for conditioning air inside an enclosure during the day and heating said air during the night, said method comprising:
(a) providing a source of water vapor inside said enclosure;
(b) providing a supply of concentrated brine;
(c) exchanging brine during the day and night between said supply and a direct contact heat exchanger in communication with the air in said enclosure;
(d) the brine in said supply having enthalpy that is less than the enthalpy of the air in the enclosure during the day, and having a concentration such that, during the day, vapor in the air in the enclosure condenses on the brine thereby drying the air in the enclosure and diluting and heating the brine returned to the supply; and
(e) concentrating the diluted brine by exposing the latter to natural temperature gradients whereby water condensed from the air during one period of time is evaporated from the diluted brine during a different period of time.

12. A method for conditioning air in a greenhouse subject to diurnal heat fluxes due, in part, to solar insolation and evapotranspiration of plants in the greenhouse during the day, and cooling during the night by:
(a) condensing water vapor in the air in the greenhouse during the day such that latent heat of condensation is transferred to a fluid;
(b) storing the transferred latent heat during the day in said fluid; and
(c) returning the stored latent heat to the air in the greenhouse during the night without adding water vapor to the air.

13. A method according to claim 12 wherein concentrated brine is cycled between a reservoir where brine is stored and a direct contact heat exchanger in the greenhouse where the brine is contacted with the air during the day for condensing water vapor in the air and during the night for heating the air.

14. A method according to claim 13 wherein the brine is sufficiently concentrated, and the reservoir is sufficiently large, to maintain the temperature of the brine entering the heat exchanger during the day at a level at which the vapor pressure of the brine is less than the vapor pressure of the air in the greenhouse.

15. A method according to claim 14 wherein water vapor is periodically removed from the brine to reconcentrate it.

16. A method according to claim 15 wherein the removal of the water occurs in a seasonal cycle.

17. A method according to claim 15 wherein brine from the reservoir is heated to remove water therefrom.

18. A method according to claim 12 ultilizing a direct contact heat exchanger during the day and night.

19. A method according to claim 15 wherein reconcentration of the brine is carried out in a solar evaporating pond.

20. A method according to claim 13 wherein water in the brine in the reservoir is periodically removed to reconcentrate the brine.

21. A method according to claim 20 wherein the brine is heated to remove water therefrom.

22. A method according to claim 21 wherein a solar evaporator is used to reconstitute the brine.

23. A method according to claim 20 wherein the brine is reconcentrated by evaporating water therefrom.

24. A method according to claim 23 wherein evaporation is accomplished by exposing the brine to ambient air.

25. Apparatus for conditioning air in a greenhouse containing growing plants comprising:
(a) a direct contact heat exchanger;
(b) means for circulating air from the greenhous through the heat exchanger;
(c) a reservoir of concentrated brine; and
(d) means for cycling brine between the reservoir and the heat exchanger while minimizing cooling of the brine while it is cycled.

26. Apparatus according to claim 25 including means for removing water from the brine.

27. Apparatus according to claim 25 wherein the heat exchanger includes web material vertically disposed between an upper supply trough and a lower receiving trough, and said means for circulating brine supplies brine from the reservoir to the upper supply trough and transfers brine from the lower receiving trough to the reservoir whereby brine flows as a film on said web material.

28. Apparatus according to claim 26 wherein the means for removing water includes a source of heat.

29. Apparatus according to claim 28 wherein the means for removing water is a solar evaporating pond.

30. Apparatus according to claim 28 wherein the means for removing water is a flash evaporator.

31. Apparatus according to claim 3 wherein the brine that enters the direct contact heat exchanger is cooler then the air in the enclosure, has an enthalpy less than the enthalpy of the sir in the enclosure during said one period of time, and is warmer than the air in the enclosure during said another period of time, and wherein heat added to the brine during said one period of time is stored for release to the air during said another period of time.

32. A method for heating air in an enclosure during a first period of time using heat extracted from the air in the enclosure during a second period of time comprising:
(a) providing brine that is cooler than the air to a direct contact heat exchanger in communication with said enclosure during said second period of time whereby the brine is heated by absorption of the latent heat of condensation of vapor as the air in the enclosure is dried and cooled by the brine;
(b) storing the heated brine in a supply;
(c) providing brine from said supply to the direct contact heat exchanger during said first period of time when the brine is warmer than the air whereby the brine heats the air as the latent heat absorbed by the brine during said second period of time is returned to the air during said first period of time.

33. Apparatus for heating the air in an enclosure during a first period of time using heat extracted form the air in the enclosure during a second period of time comprising:
(a) a brine supply whose temperature exceeds the temperature of the air in the enclosure during a first period of time, and whose enthalpy is greater than the enthalpy of the air in the enclosure during the first period of time, and whose temperature is less than the temperature of the air during a second period of time;
(b) a direct contact heat exchanger associated with the enclosure; and
(c) means for exchanging brine between the heat exchanger and the supply during both periods of time.

34. Apparatus according to claim 33 wherein said first period of time is during the night, and said second period of time is during the day.

35. Apparatus according to claim 34 including an enclosure in the form of a greenhouse containing growing plants.

36. Apparatus according to claim 34 including means for concentrating the brine in said supply.

37. Apparatus according to claim 36 wherein said means for concentrating the brine is a solar pond.

38. Apparatus according to claim 36 wherein said means for concentrating the brine is a flash evaporator.

39. A method for heating air in an enclosure during a first period of time using heat extracted from the air in the enclosure during a second period of time comprising:
(a) providing brine that is cooler than the air, and whose enthalpy is less than the enthalpy of the air, to a direct contact heat exchanger in communication with said enclosure during said second period of time whereby the brine is heated by absorption of the latent heat of condensation of vapor as the air in the enclosure is dried and cooled by the brine;
(b) storing the heated brine in a supply;
(c) providing brine from said supply to the direct contact heat exchanger during said first period of time when the brine is warmer than the air whereby the brine heats the air as the latent heat absorbed by the brine during said second period of time is returned to the air during said first period of time.

40. A method for space heating an enclosure at night comprising the steps of: providing a source of water vapor inside said enclosure during the dya; providing a supply of brine that is cooler than the air in the enclosure during the day; exposing brine from said supply to the air in said enclosure during the day for drying the air and heating the brine to a temperature above that of the supply; returning the heated brine to the supply whose heat content is increased thereby; and exposing brine from said supply to the air in the enclosure at night when the air in the enclosure is cooler than the brine in the supply for transferring heat added to the supply during the day to the air in the enclosure at night.

41. A method for space heating an enclosure at night comprising the steps of: providing a source of water vapor inside said enclosure during the day; providing a supply of brine whose enthalpy is less than the enthalpy of the air in the enclosure during the day; exposing brine from said supply to the air in said enclosure during the day for drying the air and heating the brine to a temperature above that of the supply; returning the heated brine to the supply; and exposing brine from said supply to the air in the enclosure at night when the air in the enclosure is cooler than the brine in the supply.

42. Apparatus according to claim 3 wherein the brine that enters the direct contact heat exchanger has an enthalpy less than the enthalpy of the air in the enclosure during said one period of time, and is warmer than the air in the enclosure during said another period of time, and wherein heat added to the brine during said one period of time is stored for release to the air during said another period of time.

43. Apparatus for heating the air in an enclosure during a first period of time using heat extracted form the air in the enclosure during a second period of time comprising:
(a) a brine supply whose temperature exceeds the temperature of the air in the enclosure during a first period of time, and whose enthalpy is greater than the enthalpy of the air in the enclosure during the first period of time;
(b) a direct contact heat exchanger associated with the enclosure; and
(c) means for exchanging brine between the heat exchanger and the supply during both periods of time.

44. A method for heating air in an enclosure during a first period of time using heat extracted from the air in the enclosure during a second period of time comprising:
(a) providing brine whose enthalpy is less than the enthalpy of the air, to a direct contact heat exchanger in communication with said enclosure during said second period of time whereby the brine is heated by absorption of the latent heat of condensation of vapor as the air in the enclosure is dried and cooled by the brine;
(b) storing the heated brine in a supply;
(c) providing brine from said supply to the direct contact heat exchanger during said first period of time when the brine is warmer than the air whereby the brine heats the air as the latent heat absorbed by the brine during said second period of time is returned to the air during said first period of time.

45. A method for space heating an enclosure at night comprising the steps of: providing a source of water vapor inside said enclosure during the day; providing a supply of brine whose enthalpy is less than the enthalpy of the air in the enclosure during the day; exposing brine from said supply to the air in said enclosure during the day for drying the air and heating the brine to a temperature above that of the supply; returning the heated brine to the supply whose heat content is increased thereby; and exposing brine from said supply to the air in the enclosure at night when the air in the enclosure is cooler than the brine in the supply for tranfering heat added to the supply during the day to the air in the enclosure at night.

46. A method according to claim 11 wherein the periods of time are seasonal.

* * * * *